United States Patent
Lee

(10) Patent No.: US 11,603,826 B2
(45) Date of Patent: Mar. 14, 2023

(54) LIFT BUFFERING STRUCTURE

(71) Applicant: LONGSHUEI TECHNOLOGY CO., LTD., Taichung (TW)

(72) Inventor: Ying-Hua Lee, Taichung (TW)

(73) Assignee: LONGSHUEI TECHNOLOGY CO., LTD., Taichung (TW)

( * ) Notice: Subject to any disclaimer, the term of this patent is extended or adjusted under 35 U.S.C. 154(b) by 43 days.

(21) Appl. No.: 17/344,990

(22) Filed: Jun. 11, 2021

(65) Prior Publication Data

US 2022/0333581 A1 Oct. 20, 2022

(30) Foreign Application Priority Data

Apr. 15, 2021 (TW) .................................. 110113566

(51) Int. Cl.
*F16M 13/00* (2006.01)
*F03G 1/10* (2006.01)
*F16B 7/14* (2006.01)
*F16M 11/26* (2006.01)
*F03G 1/02* (2006.01)

(52) U.S. Cl.
CPC .............. *F03G 1/10* (2013.01); *F16B 7/1409* (2013.01); *F16M 11/26* (2013.01); *F03G 1/024* (2021.08)

(58) Field of Classification Search
CPC ............ F02G 1/10; F16B 2/12; F16M 11/041
See application file for complete search history.

(56) References Cited

U.S. PATENT DOCUMENTS

| | | | | |
|---|---|---|---|---|
| 4,113,222 A | * | 9/1978 | Frinzel .................. | F16M 11/28 248/412 |
| 5,862,895 A | * | 1/1999 | Ricard ..................... | F16F 9/43 188/289 |
| 5,888,014 A | * | 3/1999 | Lung ....................... | F16B 2/246 403/325 |
| 5,992,815 A | * | 11/1999 | Metzdorf ............... | F16M 13/00 248/404 |
| 7,134,634 B2 | * | 11/2006 | Jeon ........................ | A47C 3/30 248/161 |
| 9,073,592 B2 | * | 7/2015 | Hsu ........................... | B62J 1/06 |
| 2009/0236783 A1 | * | 9/2009 | Doffing ................. | F16F 9/0254 267/124 |
| 2010/0308197 A1 | * | 12/2010 | Bishop ..................... | F16B 7/14 248/414 |

* cited by examiner

*Primary Examiner* — Amy J. Sterling

(57) ABSTRACT

A lift buffering structure includes a hollow column-shaped housing, a holding seat fixedly connected to an inner wall surface of the hollow column-shaped housing, an inner stem disposed in the hollow column-shaped housing and slidably extended through the holding seat, an elastic element having an end connected to the inner stem and another end to the holding seat to limit a travel stroke of the inner stem, an abutting unit disposed at one side of the holding seat opposite to the elastic element and having a width downward reduced gradually along a height direction of the hollow column-shaped housing, and an anti-slip unit connected to a lower end of the inner stem and located between the abutting unit and the inner wall surface of the hollow column-shaped housing. The lift buffering structure having the above structure can overcome a lot of problems in the conventional gas and oil struts.

5 Claims, 7 Drawing Sheets

LIFT BUFFERING STRUCTURE

CROSS-REFERENCE TO RELATED APPLICATION

This non-provisional application claims priority under 35 U.S.C. § 119(a) on Patent Application No(s). 110113566 filed in Taiwan, R.O.C. on Apr. 15, 2021, the entire contents of which are hereby incorporated by reference.

BACKGROUND OF THE INVENTION

1. Field of the Invention

The present disclosure relates to a lift buffering structure and more particular, to a lift buffering structure that can be used to replace conventional gas strut and oil strut.

2. Description of the Related Art

Different lift buffering devices, such as gas struts and oil struts, have been widely applied to machines and instruments that require buffered lifting, including medical equipment, industrial machines, ventilation windows of office buildings, and various kinds of furniture. The gas strut or the oil strut has a fluid filled therein to serve as a damper for buffering a piston in the gas or oil strut. The conventional gas strut and oil strut have some disadvantages. For example, the gas strut or the oil strut might spring up suddenly when releasing it from a braked or an anti-slipped state; the gas strut or the oil strut is uneasy to use because an operator has to laboriously retract the extended gas strut or oil strut; and, in the event of a gas leakage or oil leakage condition, the gas strut or the oil strut would not be able to provide braking and anti-slipping effects sufficient for supporting the required lifting length, resulting in degraded braking and anti-slipping performance of the gas strut or oil strut degrades over time. Further, the conventional gas strut and oil strut require high manufacturing costs because they must be completely sealed to prevent the fluid filled therein from leaking out.

BRIEF SUMMARY OF THE INVENTION

To solve the problems in the conventional lift buffering devices, an objective of the present disclosure is to provide a lift buffering structure that can be used to replace the conventional gas strut and oil strut.

To achieve at least the above objective, the lift buffering structure according to the present disclosure includes a hollow column-shaped housing, a holding seat fixedly connected to an inner wall surface of the hollow column-shaped housing, an inner stem disposed in the hollow column-shaped housing and slidably extended through the holding seat, an elastic element having an end connected to the inner stem and another end to the holding seat to limit a travel stroke of the inner stem, an abutting unit located at one side of the holding seat opposite to the elastic element and having a width gradually downward reduced along a height direction of the hollow column-shaped housing, and an anti-slip unit connected to the inner stem and located between the abutting unit and the inner wall surface of the hollow column-shaped housing.

In an embodiment, surfaces of the abutting unit defining the gradually downward reduced width of the abutting unit are slant flat surfaces.

In an embodiment, the anti-slip unit includes a roller holder and at least one roller. The roller holder is fixedly connected to a lower end of the inner stem, and the roller has a rotational shaft rotatably connected to the roller holder. The roller has a rotational surface located corresponding to the abutting unit and the inner wall surface of the hollow column-shaped housing.

In an embodiment, the rotational surface of the roller has a knurled pattern formed thereon.

In an embodiment, the abutting unit includes two slant flat surfaces and the anti-slip unit includes two rollers; and rotational surfaces of the two rollers are located corresponding to the two slant flat surfaces.

In an embodiment, the lift buffering structure includes two abutting units, and the roller is formed on each of two end portions with a rotational surface. And, the two rotational surfaces on the roller are located corresponding to the two abutting units.

In an embodiment, the anti-slip unit is in the form of two beveled blocks respectively having a radially inward beveled surface.

In an embodiment, the surfaces of the abutting unit defining the gradually downward reduced width of the abutting unit are curved surfaces.

In the above embodiment, the anti-slip unit includes a roller holder and at least one roller. The roller holder is fixedly connected to a lower end of the inner stem, and the roller has a rotational shaft rotatably connected to the roller holder. And, the roller has a rotational surface located corresponding to the abutting unit and the inner wall surface of the hollow column-shaped housing.

In the above embodiment, the anti-slip unit can be in the form of two beveled blocks respectively having a radially inward beveled surface.

The lift buffering structure according to the present disclosure can be used to replace the conventional gas strut and oil strut. It is because the elastic force produced by the elastic element and the frictional force between the anti-slip unit and the abutting unit and the inner wall surface of the hollow column-shaped housing have the buffering and damping effects, making the lift buffering structure of the present disclosure durable and stable for use, free of air and oil leakage, capable of providing improved user operating feel, and producible with effectively reduced manufacturing costs.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1:
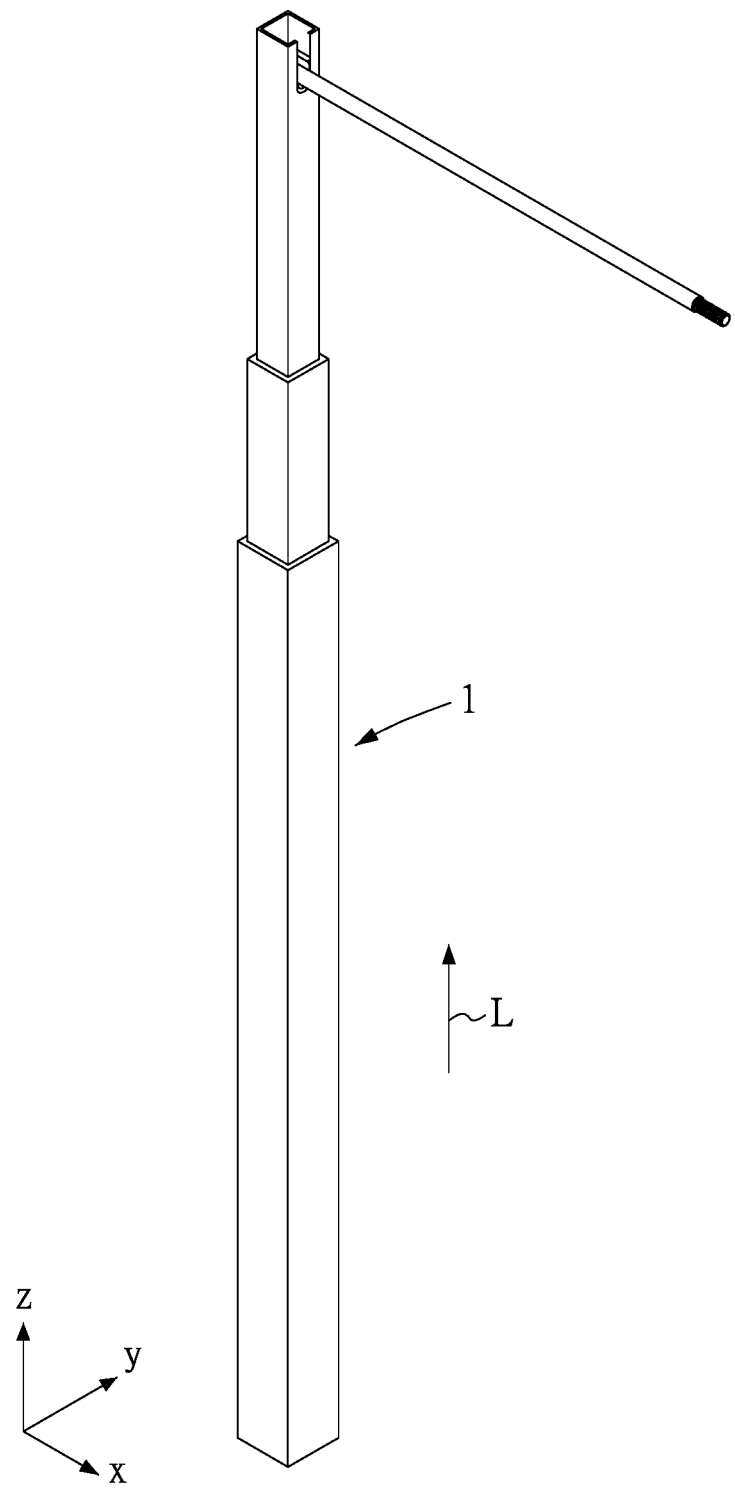
FIG. 1 is a perspective view of a lift buffering structure according to a first embodiment of the present disclosure.
Figure 2:
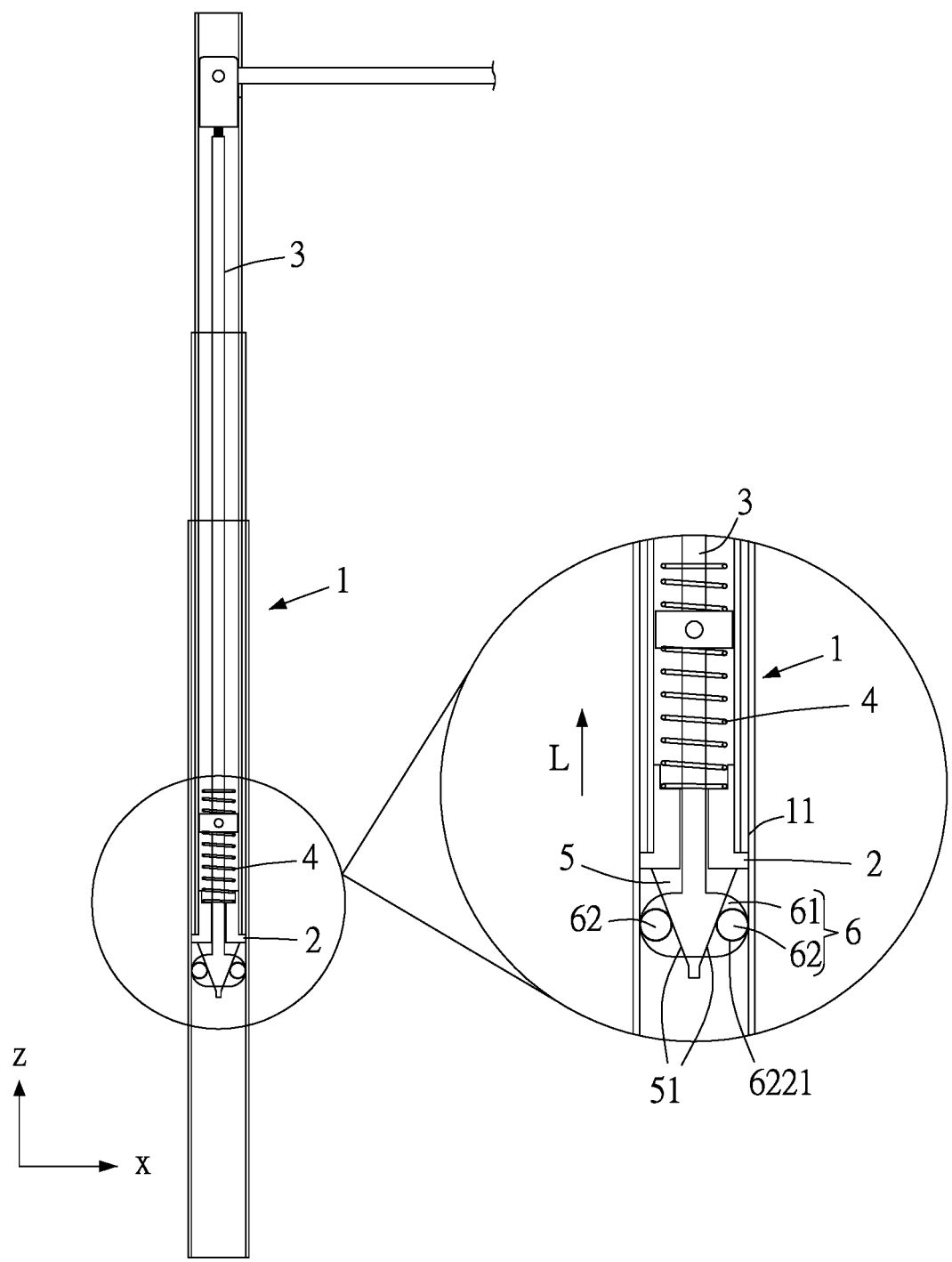
FIG. 2 is a longitudinal sectional view of the lift buffering structure shown in FIG. 1.

As shown in FIGS. 1 and 2, a lift buffering structure according to a first embodiment of the present invention is shown and generally denoted by reference numeral 100. The lift buffering structure 100 includes a hollow column-shaped housing 1, a holding seat 2, an inner stem 3, an elastic element 4, an abutting unit 5, and an anti-slip unit 6.

The hollow column-shaped housing 1 looks like a column and defines a height direction L. In the first embodiment, the hollow column-shaped housing 1 is square in cross section. However, it is noted the present disclosure is not particularly limited thereto. In other operable embodiments, the hollow column-shaped housing 1 can be a hollow column with round or any other polygonal cross section, or can even be a conical column or a pyramid column having a size-variable cross-sectional area.

The holding seat 2 is immovably connected to an inner wall surface 11 of the hollow column-shaped housing 1. More specifically, the holding seat 2 can be integrally formed with the hollow column-shaped housing 1 or be fixedly screwed to the inner wall surface 11 or in other possible means without being limited to any particular manner.

The inner stem 3 is disposed in the hollow column-shaped housing 1 and is slidably extended through the holding seat 2. The inner stem 3 can be round, oblong or other polygonal in cross section without being particularly limited.

The elastic element 4 has an end connected to the inner stem 3 and another end connected to the holding seat 2, so as to limit a travel stroke of the inner stem 3. In other words, when the inner stem 3 moves downward in the hollow column-shaped housing 1 along the height direction L, the elastic element 4 is compressed. Please refer to FIG. 3. When the elastic element 4 releases its elastic potential energy, it pushes the inner stem 3 upward to a reset position. In the first embodiment, the elastic element 4 includes, but not limited to, a coil spring.

The abutting unit 5 is located at one side of the holding seat 2 opposite to the elastic element 4, and has a width that is downward reduced gradually along the height direction L of the hollow column-shaped housing 1. In other words, a distance between the abutting unit 5 and the inner wall surface 11 of the hollow column-shaped housing 1 is variable to gradually reduce toward the holding seat 2.

The anti-slip unit 6 is connected to the inner stem 3 and is located between the abutting unit 5 and the inner wall surface 11 of the hollow column-shaped housing 1.

When the elastic element 4 is in a non-compressed state, the anti-slip unit 6 is pressed at two lateral sides against the inner wall surface 11 and the abutting unit 5. When the inner stem 3 is moved downward along the height direction L of the hollow column-shaped housing 1, the anti-slip unit 6 has one lateral side keeping contact with the inner wall surface 11, and a frictional force between the anti-slip unit 6 and the inner wall surface 11 enables the inner stem 3 to lower stably. Meanwhile, the other lateral side of the anti-slip unit 6 is separated from the abutting unit 5 without contacting with the latter.

Figure 3:
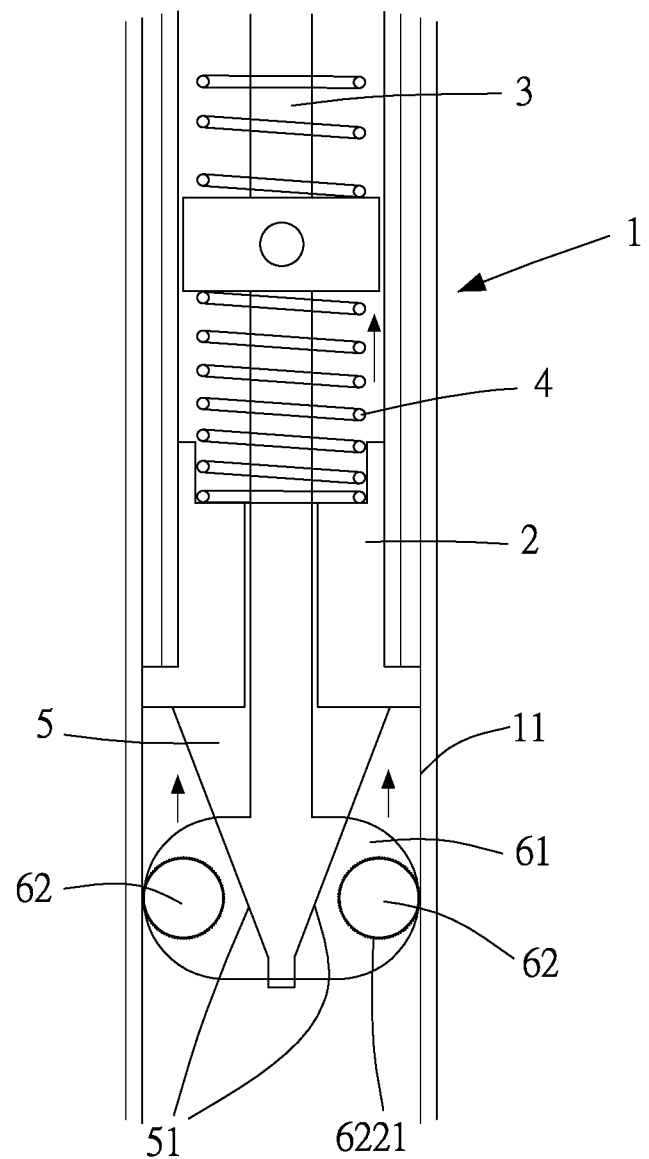
FIG. 3 is a fragmentary sectional view showing the lift buffering structure according to the first embodiment of the present disclosure is being elastically pushed upward to a reset position.

As shown in FIG. 3, when the elastic element 4 releases it elastic potential energy, the elastic element 4 pushes the inner stem 3 to its reset position and the anti-slip unit 6 has one lateral side keeping contact with the inner wall surface 11 to produce a frictional force between it and the inner wall surface 11. Meanwhile, the other lateral side of the anti-slip unit 6 is gradually brought to contact with the abutting unit 5 to produce a frictional force between the anti-slip unit 6 and the abutting unit 5. The frictional force between the anti-slip unit 6 and the inner wall surface 11 and the abutting unit 5 is used to suppress an ascending speed of the inner stem 3 to thereby achieve a braking and anti-slip effect.

In summary, the lift buffering structure 100 according to the present disclosure can be used to replace the conventional gas strut and oil strut. The elastic force of the elastic element 4 and the frictional force between the anti-slip unit 6 and the inner wall surface 11 and the abutting unit 5 to together achieve buffering and damping effects. The lift buffering structure 100 of the present disclosure has the advantages of durable for use, free of the problem of air leakage or oil leakage, even better operating feel, and reduced manufacturing cost.

Figure 4:
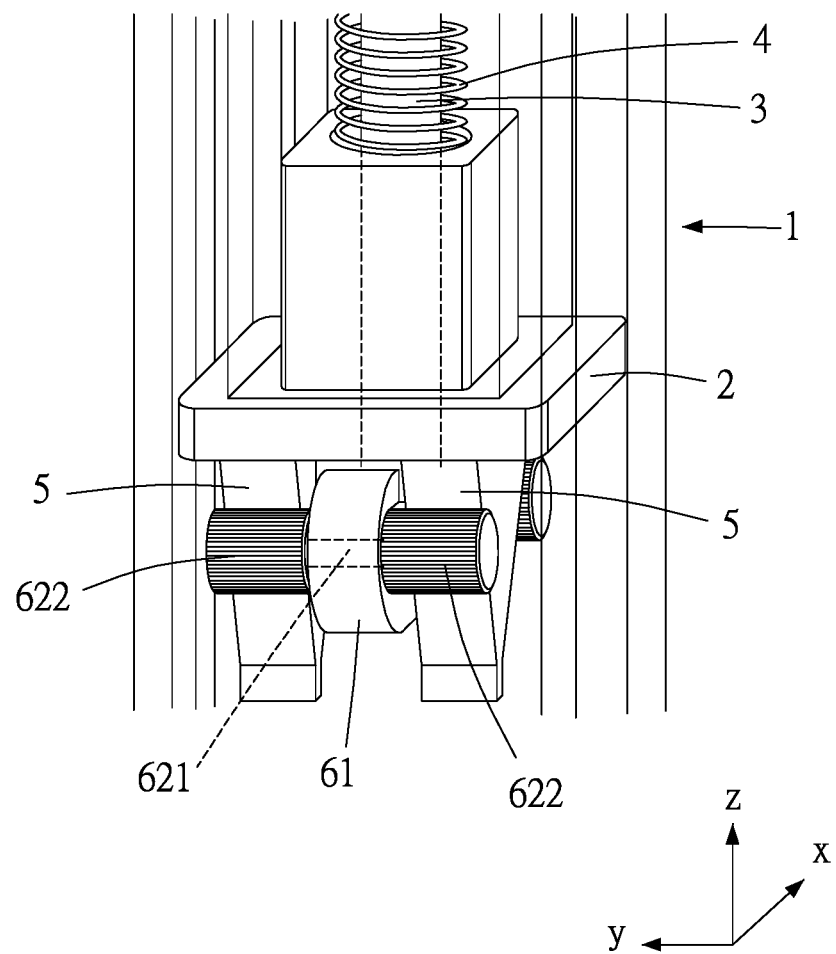
FIG. 4 is a cut away view of the lift buffering structure according to the first embodiment of the present disclosure.

Further, as shown in FIGS. 2 and 4, in the first embodiment, the abutting unit 5 has two tapered side wall surfaces that are respectively a slant flat surface 51. The anti-slip unit 6 includes a roller holder 61 and at least one roller 62. The roller holder 61 is fixedly connected to the inner stem 3, and the roller 62 has a rotational shaft 621 rotatably connected to the roller holder 61. The roller 62 has a rotational surface 622, which is correspondingly pressed against the abutting unit 5 and the inner wall surface 11 of the hollow column-shaped housing 1. Due to a rotating property of the roller 62, the inner stem 3 can move more smoothly, and the roller 62 in rotating also produces a constant frictional force between it and the inner wall surface 11 and the abutting unit 5.

Further, as shown in FIG. 2, the roller 62 is provided on the rotational surface 622 with a knurled pattern 6221, which can produce increased frictional force when the roller 62 contacts with the abutting unit 5 and the inner wall surface 11 of the hollow column-shaped housing 1.

As shown in FIGS. 2 and 4, the abutting unit 5 can be a two-fold symmetrical structure having two laterally symmetrical slant flat surfaces 51, and the anti-slip unit 6 can include two rollers 62 with their rotational surfaces 622 separately located corresponding to the two slant flat surfaces 51. With these arrangements, the lift buffering structure 100 can have a further balanced structure, and lateral force produced by the rollers 62 is also offset when the rollers 62 rotate.

As shown in FIG. 4, there can be two abutting units 5 included in the lift buffering structure 100, and the roller holder 61 is located between the two abutting units 5. In this case, the two rollers 62 are respectively provided at each of two end portions thereof with one rotational surface 622, so that the rotational surfaces 622 are located corresponding to the two abutting units 5. With these arrangements, the lift buffering structure 100 is more balanced formed in two directions and has increased frictional areas on the rollers 62 to provide an enhanced anti-slip effect.

Figure 5:
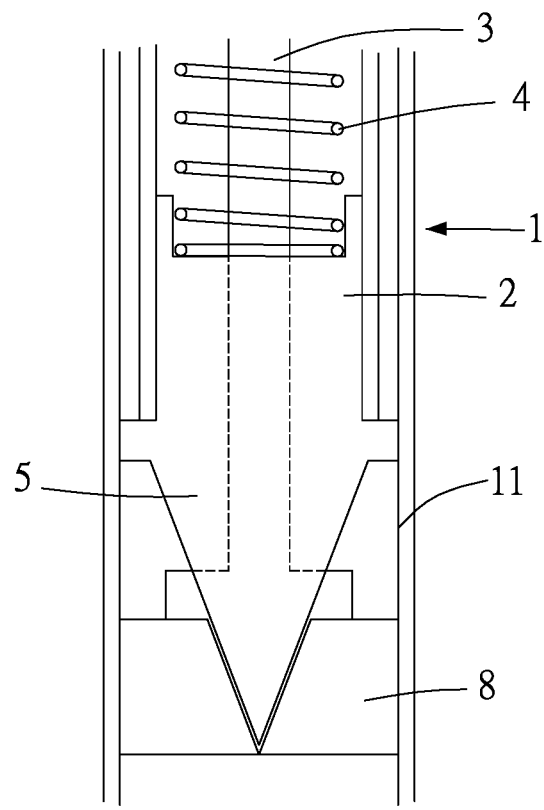
FIG. 5 is a fragmentary, longitudinally sectional view of the lift buffering structure according to a second embodiment of the present disclosure.

Please refer to FIG. 5, in which a lift buffering structure according to a second embodiment is shown and generally denoted by reference numeral 100a. The lift buffering structure 100a is different from the lift buffering structure 100 in the first embodiment in that it includes an anti-slip unit 8 being two blocks respectively having a radially inward and downward beveled surface. The beveled surfaces of the anti-slip unit 8 are pressed against the abutting unit 5 and two outer surfaces of the anti-slip unit 8 are in frictional contact with the inner wall surface 11 to achieve the anti-slip effect.

Figure 6:
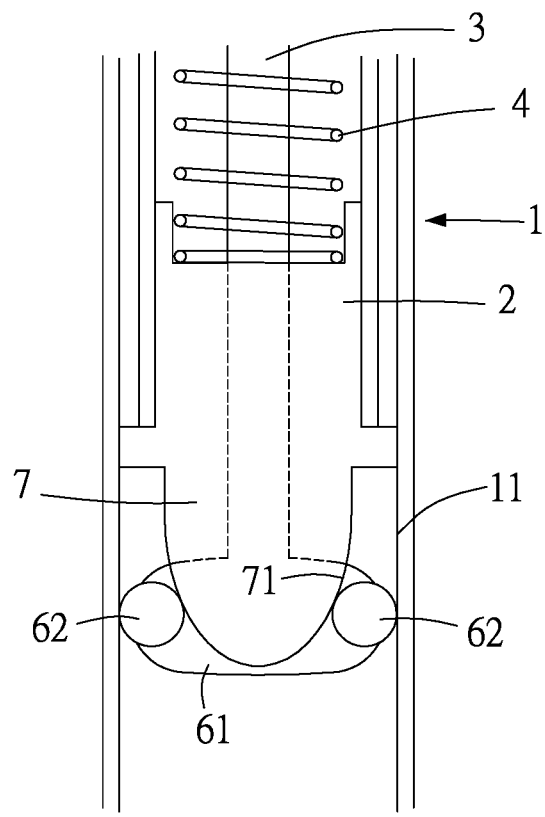
FIG. 6 is a fragmentary, longitudinally sectional view of the lift buffering structure according to a third embodiment of the present disclosure.

Please refer to FIG. 6, in which a lift buffering structure according to a third embodiment is shown and generally denoted by reference numeral 100b. The lift buffering structure 100b is different from the lift buffering structure 100 in the first preferred embodiment in that it includes an abutting unit 7 having two lateral surfaces being downward tapered curved surfaces 71. The distance between the abutting unit 7 and the inner wall surface 11 of the hollow column-shaped housing 1 is also varied gradually. The rollers 62 are in contact with the abutting unit 7 and with the inner wall surface 11 of the hollow column-shaped housing 1, so that fractional force is also produced between them.

Figure 7:
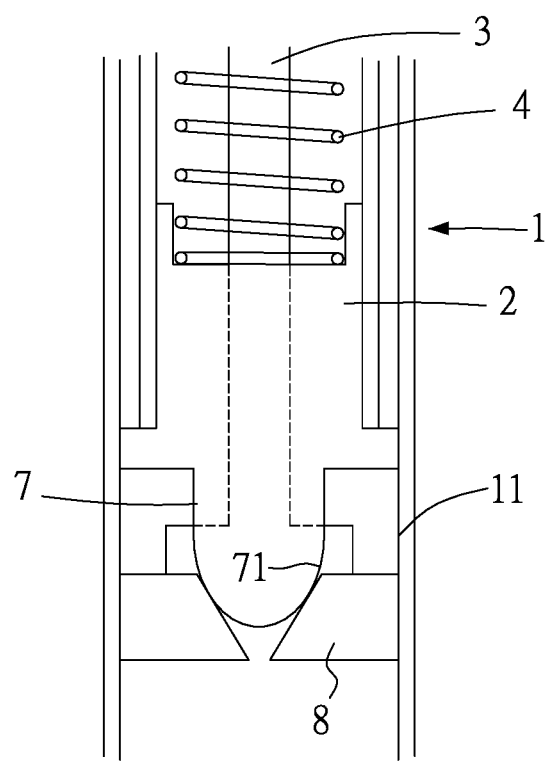
FIG. 7 is a fragmentary, longitudinally sectional view of the lift buffering structure according to a fourth embodiment of the present disclosure.

Please refer to FIG. 7, in which a lift buffering structure according to a fourth embodiment is shown and generally denoted by reference numeral 100c. The lift buffering structure 100c is different from the lift buffering structure 100b in the third embodiment in that it has an anti-slip unit 8 being two blocks respectively having a radially inward and downward beveled surface. The beveled surfaces of the anti-slip unit 8 are pressed against the abutting unit 7, and two outer surfaces of the anti-slip unit 8 are in frictional contact with the inner wall surface 11 to achieve the anti-slip effect.

While the present disclosure has been described by means of specific embodiments, numerous modifications and variations could be made thereto by those skilled in the art without departing from the scope and spirit of the present disclosure set forth in the claims.

What is claimed is:

1. A lift buffering structure, comprising:
   a hollow column-shaped housing;
   a holding seat being immovably connected to an inner wall surface of the hollow column-shaped housing;
   an inner stem being disposed in the hollow column-shaped housing and slidably extended through the holding seat;
   an elastic element having an end connected to the inner stem and another end connected to the holding seat to limit a travel stroke of the inner stem;
   an abutting unit being disposed at one side of the holding seat opposite to the elastic element and having a width downward reduced gradually along a height direction of the hollow column-shaped housing; and
   an anti-slip unit, wherein the anti-slip unit includes a roller holder and two rollers, the roller holder fixedly connected to a lower end of the inner stem, the two rollers have a rotational shaft rotatably connected to the roller holder respectively, and the two rollers are respectively slidably along the axial direction of the inner stem and located between the abutting unit and the inner wall surface of the hollow column-shaped housing, and one lateral side of each rollers keeps contacting with the inner wall surface, and other lateral side of each rollers is gradually separated from the abutting unit or gradually brought to contact with the abutting unit.

2. The lift buffering structure according to claim 1, wherein surfaces of the abutting unit defining the gradually reduced width of the abutting unit are slant flat surfaces.

3. The lift buffering structure according to claim 1, wherein the rotational surface of the roller has a knurled pattern formed thereon.

4. The lift buffering structure according to claim 1, further comprising another abutting unit, and the two rollers are formed on each of two end portions with a rotational surface; and the two rotational surfaces on the roller being located corresponding to the two abutting units.

5. The lift buffering structure according to claim 1, wherein surfaces of the abutting unit defining the gradually reduced width of the abutting unit are curved surfaces.

* * * * *